(12) United States Patent
Miyashita et al.

(10) Patent No.: US 8,679,341 B2
(45) Date of Patent: Mar. 25, 2014

(54) METHOD OF CONCENTRATING NANOPARTICLES AND METHOD OF DEAGGREGATING AGGREGATED NANOPARTICLES

(75) Inventors: Yousuke Miyashita, Minami-ashigara (JP); Hachiro Nakanishi, Sendai (JP); Hitoshi Kasai, Sendai (JP); Akito Masuhara, Sendai (JP)

(73) Assignees: FUJIFILM Corporation, Tokyo (JP); Tohoku University, Sendai-Shi (JP)

( * ) Notice: Subject to any disclaimer, the term of this patent is extended or adjusted under 35 U.S.C. 154(b) by 519 days.

(21) Appl. No.: 11/919,076

(22) PCT Filed: May 8, 2006

(86) PCT No.: PCT/JP2006/309608
§ 371 (c)(1),
(2), (4) Date: Oct. 23, 2007

(87) PCT Pub. No.: WO2006/121170
PCT Pub. Date: Nov. 16, 2006

(65) Prior Publication Data
US 2009/0071908 A1    Mar. 19, 2009

(30) Foreign Application Priority Data

May 6, 2005 (JP) .................................. 2005-135205
May 6, 2005 (JP) .................................. 2005-135206

(51) Int. Cl.
*B01D 11/02* (2006.01)
*B01D 17/02* (2006.01)
*B01D 17/025* (2006.01)

(52) U.S. Cl.
USPC ........................... 210/634; 210/799; 977/895

(58) Field of Classification Search
USPC ................................... 210/634, 799; 977/882
See application file for complete search history.

(56) References Cited

U.S. PATENT DOCUMENTS 1,600 A    5/1840  McGregor, Jr.
32,250 A   5/1861  Jackson et al.
(Continued)

FOREIGN PATENT DOCUMENTS

EP    0824036 A1    2/1998
EP    1541637 A1    6/2005
(Continued)

OTHER PUBLICATIONS

Concise Explanation of Documents (JP-11-237760-A, WO-02/092700-A1, JP-6-79168-A and JP-2004-91560-A).

(Continued)

Primary Examiner — Katherine Zalasky
(74) Attorney, Agent, or Firm — Birch, Stewart, Kolasch & Birch, LLP

(57) ABSTRACT

A method of concentrating nanoparticles, having the steps of: adding and mixing an extraction solvent with a nanoparticles-dispersion liquid that nanoparticles are dispersed in a dispersion solvent, thereby concentrating and extracting the nanoparticles into a phase of the extraction solvent, and removing the dispersion solvent by filter-filtrating a liquid of concentrated extract, in which the extraction solvent is substantially incompatible with the dispersion solvent, and the extract solvent can form an interface after the extraction solvent is mixed with the dispersion solvent and left the mixture still; further a method of deaggregating aggregated nanoparticles, having the steps of: applying two or more ultrasonic waves different in frequency to a liquid containing aggregated nanoparticles, and thereby fining and dispersing the aggregated nanoparticles.

4 Claims, 1 Drawing Sheet

(56) References Cited

U.S. PATENT DOCUMENTS

| | | | |
|---|---|---|---|
| 1,351,352 A | 6/1920 | Stevens et al. | |
| 1,592,713 A | 7/1926 | Bendixen | |
| 1,692,617 A | 11/1928 | Bowen | |
| 2,176,899 A | 10/1939 | Gordon et al. | |
| 2,464,588 A | 3/1949 | Knudsen et al. | |
| 2,642,419 A | 6/1953 | Waugh et al. | |
| 2,984,462 A | 5/1961 | O'Connor | |
| 3,018,091 A | 1/1962 | Duggins | |
| 3,290,016 A | 12/1966 | Lennon et al. | |
| 3,415,650 A | 12/1968 | Frame et al. | |
| 3,443,748 A | 5/1969 | Hooper | |
| 3,486,741 A | 12/1969 | Midgette | |
| 3,529,936 A | 9/1970 | Muller-Rid et al. | |
| 3,615,543 A | 10/1971 | Rosenoff | |
| 3,638,917 A | 2/1972 | Osten | |
| 3,709,828 A | 1/1973 | Marks | |
| 3,845,938 A | 11/1974 | Schold | |
| 3,893,811 A | 7/1975 | Good et al. | |
| 4,289,733 A | 9/1981 | Saito et al. | |
| 4,373,093 A | 2/1983 | Olson et al. | |
| 4,391,648 A | 7/1983 | Ferrill, Jr. | |
| 4,464,240 A | 8/1984 | Hansen | |
| 4,621,928 A | 11/1986 | Schreiber | |
| 4,666,669 A | 5/1987 | Mumaw | |
| 4,898,998 A | 2/1990 | Kubo et al. | |
| 5,294,728 A | 3/1994 | Emmons et al. | |
| 5,629,367 A * | 5/1997 | Lofftus et al. | 524/88 |
| 5,837,041 A | 11/1998 | Bean et al. | |
| 5,854,323 A | 12/1998 | Itabashi et al. | |
| 5,869,103 A | 2/1999 | Yeh et al. | |
| 5,882,114 A | 3/1999 | Fukuyo et al. | |
| 5,961,213 A | 10/1999 | Tsuyuki et al. | |
| 5,985,535 A | 11/1999 | Urabe | |
| 6,000,840 A | 12/1999 | Paterson | |
| 6,042,792 A | 3/2000 | Schefer et al. | |
| 6,153,001 A | 11/2000 | Suzuki et al. | |
| 6,245,832 B1 | 6/2001 | Suzuki et al. | |
| 6,395,805 B1 | 5/2002 | Takao | |
| 6,410,619 B2 | 6/2002 | Greene et al. | |
| 6,422,736 B1 | 7/2002 | Antoniades et al. | |
| 6,443,611 B1 | 9/2002 | Hasberg et al. | |
| 6,572,227 B2 | 6/2003 | Yamashita et al. | |
| 6,921,433 B2 * | 7/2005 | Kuribayashi et al. | 106/499 |
| 7,153,358 B2 * | 12/2006 | Weber et al. | 106/498 |
| 7,348,029 B2 * | 3/2008 | Kliss et al. | 424/490 |
| 2002/0101783 A1 | 8/2002 | Hasberg et al. | |
| 2002/0112644 A1 | 8/2002 | Nakamura et al. | |
| 2002/0156154 A1 | 10/2002 | Ando et al. | |
| 2003/0077536 A1 | 4/2003 | Yamashita et al. | |
| 2003/0152857 A1 | 8/2003 | Sugiura et al. | |
| 2003/0198761 A1 | 10/2003 | Kaeding et al. | |
| 2004/0025634 A1 | 2/2004 | Nakamura et al. | |
| 2004/0027415 A1 | 2/2004 | Yamashita et al. | |
| 2004/0055621 A1 | 3/2004 | McDermott et al. | |
| 2004/0071958 A1 | 4/2004 | Marx et al. | |
| 2004/0106057 A1 | 6/2004 | Tomita et al. | |
| 2004/0121256 A1 | 6/2004 | Suzuki et al. | |
| 2007/0012221 A1 | 1/2007 | Maeta et al. | |
| 2009/0033844 A1 | 2/2009 | Ando et al. | |
| 2009/0045535 A1 | 2/2009 | Miyashita et al. | |
| 2009/0059138 A1 | 3/2009 | Matsumoto et al. | |
| 2009/0069473 A1 | 3/2009 | Kusano et al. | |
| 2009/0071373 A1 | 3/2009 | Izumi et al. | |
| 2009/0071908 A1 | 3/2009 | Miyashita et al. | |
| 2009/0101043 A1 | 4/2009 | Ogata et al. | |

FOREIGN PATENT DOCUMENTS

| | | |
|---|---|---|
| JP | 55-10545 B2 | 3/1980 |
| JP | 01-115976 A | 5/1989 |
| JP | 03-021339 A | 1/1991 |
| JP | 03-161592 A | 7/1991 |
| JP | 05-017133 A | 1/1993 |
| JP | 5-214008 A | 8/1993 |
| JP | 6-79168 A | 3/1994 |
| JP | 06-114259 A | 4/1994 |
| JP | 7-138838 A | 5/1995 |
| JP | 8-231210 A | 9/1996 |
| JP | 9-77991 A | 3/1997 |
| JP | 9-510477 A | 10/1997 |
| JP | 10-043570 A | 2/1998 |
| JP | 10-230158 A | 9/1998 |
| JP | 11-237760 A | 8/1999 |
| JP | 11-269432 A | 10/1999 |
| JP | 2000-239554 A | 9/2000 |
| JP | 2001-031900 A | 2/2001 |
| JP | 2002-179976 A | 6/2002 |
| JP | 2002-194244 A | 7/2002 |
| JP | 2003-113341 A | 4/2003 |
| JP | 2003-201419 A | 7/2003 |
| JP | 2003-225900 A | 8/2003 |
| JP | 2003-260347 A | 9/2003 |
| JP | 2004-1471 A | 1/2004 |
| JP | 2004-043776 A | 2/2004 |
| JP | 2004-91560 A | 3/2004 |
| JP | 2004-091560 A | 3/2004 |
| JP | 2004-123853 A | 4/2004 |
| JP | 2004-181312 A | 7/2004 |
| JP | 2004-182751 A | 7/2004 |
| JP | 2004-262941 A | 9/2004 |
| JP | 2004-268019 A | 9/2004 |
| JP | 2004-292632 A | 10/2004 |
| JP | 2006-508211 A | 3/2006 |
| JP | 2006-104448 A | 4/2006 |
| JP | 2007-262378 A | 10/2007 |
| WO | WO-02/092700 A1 | 11/2002 |
| WO | WO-03/035035 A1 | 5/2003 |
| WO | WO-03/054953 A1 | 7/2003 |
| WO | WO 03/080034 A2 | 10/2003 |
| WO | WO-2004/029161 A1 | 4/2004 |
| WO | 2006/121016 A1 | 11/2006 |

OTHER PUBLICATIONS

Final Office Action dated Nov. 10, 2009 in U.S. Appl. No. 11/919,982.
Final Office Action mailed Aug. 18, 2009 in copending U.S. Appl. No. 11/919,988.
Final Office Action mailed Feb. 2, 2010 in copending U.S. Appl. No. 11/920,082.
International Search Report mailed Aug. 1, 2006 for PCT/JP2006/309269.
International Search Report mailed Feb. 6, 2007 for PCT/JP2006/322306.
International Search Report mailed Jul. 18, 2006 for PCT/JP2006/309270.
International Search Report mailed Jul. 25, 2006 for PCT/JP2006/309268.
Non-Final Office Action dated May 6, 2009 in U.S. Appl. No. 11/919,982.
Non-Final Office Action mailed Aug. 3, 2009 in copending U.S. Appl. No. 11/920,082.
Non-Final Office Action mailed Mar. 19, 2009 in co-pending U.S. Appl. No. 11/919,988.
Office Action dated Sep. 28, 2009 in corresponding Korean Application No. 2007-7028498 with English Translation.
Decision to Grant a Patent dated Oct. 25, 2011 for Japanese Application No. 2005-135205.
Notice of Reasons for Rejection dated Dec. 13, 2011 for Japanese Application No. 2006-129714.
Notice of Reasons for Rejection dated Dec. 13, 2011 for Japanese Application No. 2006-533384.
Korean Office Action for Application No. 2007-7028413 dated Sep. 28, 2012 (with English translation).
Japanese Office Action issued Mar. 1, 2011 in corresponding Japanese patent application No. 2005-135205 (with English translation).
Japanese Office Action issued Mar. 1, 2011 in corresponding Japanese patent application No. 2005-135206 (with English translation).

* cited by examiner

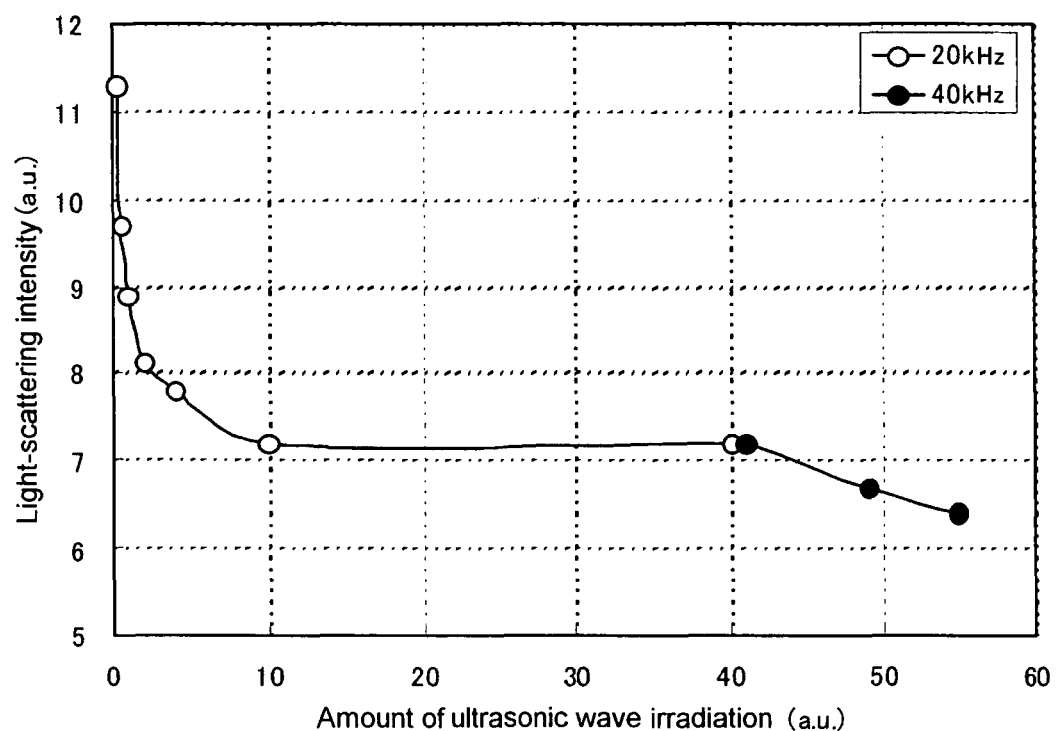

METHOD OF CONCENTRATING NANOPARTICLES AND METHOD OF DEAGGREGATING AGGREGATED NANOPARTICLES

TECHNICAL FIELD

The present invention relates to a method of producing nanoparticles, specifically to a method of efficiently concentrating nanoparticles contained in a dispersion liquid and to a method of efficiently deaggregating aggregated nanoparticles.

BACKGROUND ART

Study to reduce the size of particles has been in progress. In particular, intensive study has aimed at reducing particles into nanometer size (for example, in the range of 10 to 100 nm) which is hardly realized by conventional methods of pulverization, precipitation, and others. Further, other study has aimed at not only reducing the size of particles into nanometer size, but also obtaining the particles in a monodispersed condition.

Such nanometer-sized fine particles are different from bulk particles (bigger in size) and from molecules and atoms (smaller in size). That is, the nanometer-size fine particles have a position between them in size. Thus, such nanoparticles are considered to show unexpected properties novel over the conventional size of particles. It is also possible to stabilize the properties of nanoparticles if they can be monodispersed. Thus, nanoparticles having such a possibility are attracting attention in various fields, and they have been studied increasingly in a variety of fields such as biochemistry, new materials, electronic elements, light-emitting display devices, printing, and medicine.

In particular, organic nanoparticles made of an organic compound involve great potential, because the organic compounds, per se, can be modified diversely. Among the organic nanoparticles, organic pigments are used in such applications as painting, a printing ink, an electrophotographic toner, an inkjet ink, and a color filter, and thus the organic pigments are now important materials essential for our everyday life. Particularly, organic pigments are demanded in high-performance with practical importance include pigments for an inkjet ink and a color filter.

Dyes have been used as the colorants for inkjet inks, but pigments are employed recently for solving the problems of dyes in water resistance and light stability. Images obtained by using a pigment ink have an advantage that they are superior in light stability and water resistance to the images formed by using a dye-based ink. However, it is difficult to fine particles uniformly into the nanometer size range (i.e., monodispersing), and therefore the pigment particles can hardly penetrate into the pores on paper surface. As a result, such an image has a problem that the adhesiveness thereof to paper is weaker.

Further, the increase in the number of pixels of a digital camera, there is increased need for reduction in thickness of the color filter for use in optical elements such as an CCD sensor and an display device. Organic pigments have been used in color filters, and a filter thickness depends significantly on the particle diameter of the organic pigment. Hence, it is needed to produce fine particles in a nanometer size, with having stability in a monodispersed state.

As for production methods of organic nanoparticles, studies are made on, for example, a gas-phase method (of sublimating a sample under inert gas atmosphere and depositing particles on a substrate), a liquid-phase method (of obtaining nanoparticles by injecting a sample dissolved in a good solvent through a minute nozzle into a poor solvent of which the agitating condition and the temperature are controlled), and a laser-ablation method (of reducing the size of particles by laser-ablation of a sample dissolved in a solution with laser). There are also reports on preparation of monodispersed nanoparticles having a desired particle size by these methods (JP-T-2002-092700, JP-A-H06-79168, JP-A-2004-91560, and others; "JP-A" means unexamined published Japanese patent application, "JP-T" means published searched patent publication).

On the other hand, there are not many studies on a method of separating and collecting the nanoparticles prepared. In particular, fine particles prepared by the liquid-phase methods or laser-ablation methods are obtained as dispersed in a solvent. Accordingly, it is important to decide how to separate and collect the nanoparticles. Even when desirable nanoparticles are prepared in the form of dispersion, it is not practical, if the particle size changes and the uniformity in the particle diameter is lost in the separation/collection step or if collection of the nanoparticles demands a greater cost.

Although there are disclosed some methods for concentrating and collecting nanoparticles from dispersion, there is still no practical method established, considering industrial-scale production.

For example, JP-A-2004-181312 discloses a method of concentrating nanoparticles by distilling an aqueous nanoparticle-containing solution with an added distillation-accelerating liquid. However, distillation employed in this method demands extra energy such as heating. Thus, this method is not suitable for industrial utilization. Further, since the heat of distillation degenerates the nanoparticles, depending on the kind of nanoparticles, this method limits its application range.

JP-A-2004-292632 discloses a method of adding, to fine particle-containing dispersion, an ionic liquid substantially insoluble therein, and concentrating the fine particles into the ionic liquid. However, the method often results in insufficient concentration of fine particles into the ionic liquid, and thus the method is inefficient.

Further, "Current Pigment Dispersion Technology", Technical Information Institute Co., Ltd., 1995, p. 166, discloses a method of transferring the pigment and resin from an aqueous phase to an oil phase by using an apparatus called kneader. However, the method disclosed therein is a part of steps for preparing an ink, and it is not certain as to if the method is applicable for concentration of nanoparticles. Besides, the method is unpractical, because it demands a high-strength stirrer, a heating/evacuating step for removal of residual water in the oil phase, and thus a large-scale facility is required for industrial production.

Moreover, separation and collection of nanoparticles, or relevant treatment thereto, involves a problem that the nanoparticles in dispersion liquid may aggregate. As a method of dispersing aggregated nanoparticles in a dispersion liquid, a method of adding a dispersant or an additive, or a mixture appropriately selecting such additives may be possibly considered. However, it is difficult to obtain a sufficiently dispersed state only by addition of additives. Addition of such additives occasionally results in deterioration in the properties of nanoparticles even if the nanoparticles are prepared in a dispersed state. Thus, it is difficult to select a dispersant and other additives that satisfy all requirements.

Other possible dispersion methods include a method of separating particles in the aggregation state by application of physical energy. For example, a method of dispersing particles in ultrasonic cleaning machine are generally described in "Current Pigment Dispersion Technology", Technical Information Institute Co., Ltd., 1995, p. 166. Alternatively, JP-A-H11-269432 discloses a method of mixing and dispersing functional fine particles in vehicles, preventing aggregation of the fine particles by application of ultrasonic wave, and thus stabilizing the dispersion. However, the method, in which only an ultrasonic wave at a fixed frequency is irradiated, can not satisfy the requirement for further fining and redispersing.

Also disclosed are methods of irradiating ultrasonic waves different in frequency to a pigment dispersed in water containing hydrogen peroxide (JP-A-2003-201419 and JP-A-2004-182751). However, these methods are also not efficient enough in the degree of fine dispersion.

DISCLOSURE OF INVENTION

According to the present invention, there are provided:

(1) A method of concentrating nanoparticles, comprising the steps of:

adding and mixing an extraction solvent with a nanoparticles-dispersion liquid that nanoparticles are dispersed in a dispersion solvent, thereby concentrating and extracting the nanoparticles into a phase of the extraction solvent, and removing the dispersion solvent by filter-filtrating a liquid of concentrated extract;

wherein the extraction solvent is substantially incompatible with the dispersion solvent, and the extraction solvent can form an interface after the extraction solvent is mixed with the dispersion solvent and left the mixture still;

(2) The method of concentrating nanoparticles according to (1), wherein concentration and extraction of the nanoparticles into the extraction-solvent phase provides aggregation of the nanoparticles to the degree that the nanoparticles are redispersible;

(3) The method of concentrating nanoparticles according to (1) or (2), wherein the dispersion solvent of the nanoparticles-dispersion liquid is a solvent selected from the group consisting of an aqueous solvent, alcohol compound solvent, ketone compound solvent, ether compound solvent, aromatic compound solvent, carbon disulfide solvent, aliphatic compound solvent, nitrile compound solvent, sulfoxide compound solvent, halogenated compound solvent, ester compound solvent, ionic solvent, and mixed solvent thereof;

(4) The method of concentrating nanoparticles according to any one of (1) to (3), wherein the nanoparticles are made of a material selected from the group consisting of an organic pigment, organic colorant, fullerene, polymeric compound, aromatic hydrocarbon, and aliphatic hydrocarbon;

(5) The method of concentrating nanoparticles according to any one of (1) to (4), wherein the extraction solvent is an ester compound solvent;

(6) A method of deaggregating aggregated nanoparticles, comprising the steps of:

applying two or more ultrasonic waves different in frequency to a liquid containing aggregated nanoparticles, and thereby fining and dispersing the aggregated nanoparticles;

(7) The method of deaggregating aggregated nanoparticles according to (6), wherein the frequency of the ultrasonic wave applied to the liquid containing the aggregated nanoparticle is varied to higher frequency within the range from 2 to 200 kHz;

(8) The method of deaggregating aggregated nanoparticles according to (6) or (7), wherein the different ultrasonic waves are applied to the liquid containing the aggregated nanoparticles in the manner that an ultrasonic wave at 10 kHz or more, less than 30 kHz is applied, and then another ultrasonic wave at 30 to 60 kHz is applied;

(9) The method of deaggregating aggregated nanoparticles according to any one of (6) to (8), wherein a series of ultrasonic wave irradiation consists of applying two or more ultrasonic waves different in frequency, and the series is performed repeatedly multiple times;

(10) The method of deaggregating aggregated nanoparticles according to any one of (6) to (9), wherein the nanoparticles are made of a material selected from the group consisting of an organic pigment, organic colorant, fullerene, polymeric compound, aromatic hydrocarbon, and aliphatic hydrocarbon;

(11) The method of deaggregating aggregated nanoparticles according to any one of (6) to (10), wherein the ultrasonic wave is applied while the liquid containing the aggregated nanoparticles is kept at a temperature in the range from 5° C. to 60° C.

Other and further features and advantages of the invention will appear more fully from the following description, taken in connection with the accompanying drawing.

BRIEF DESCRIPTION OF DRAWING

FIG. 1 is a graph showing the relationship between the change in light-scattering intensity of a pigment liquid and the amount of ultrasonic wave irradiation.

BEST MODE FOR CARRYING OUT INVENTION

Hereinafter, the present invention will be described in detail.

A method of concentrating nanoparticles according to the present invention is explained as follows.

The nanoparticles for use in the method of concentrating nanoparticles according to the present invention are not particularly limited, as long as the particles are dispersible in a dispersion solvent, and may be inorganic or organic nanoparticles, or a combination thereof. Examples of the organic nanoparticles include nanoparticles of organic pigments, organic colorants, fullerene, polymeric compounds such as polydiacetylene, aromatic or aliphatic hydrocarbons (for example, self-orienting aromatic or aliphatic hydrocarbons, or sublimable aromatic or aliphatic hydrocarbons), or the like; nanoparticles of organic pigments, organic colorants, and polymeric compounds are preferable; and, those of organic pigments are particularly preferable. A mixture thereof may also be used.

An organic pigment for use in the present invention is not limited in the color tone thereof, and it may be a magenta pigment, a yellow pigment, or a cyan pigment. Specifically, the organic pigment may be a magenta pigment, a yellow pigment or a cyan pigment of a perylene, perynone, quinacridone, quinacridonequinone, anthraquinone, anthanthrone, benzimidazolone, condensed disazo, disazo, azo, indanthrone, phthalocyanine, triaryl carbonium, dioxazine, aminoanthraquinone, diketopyrrolopyrrole, thioindigo, isoindoline, isoindolinone, pyranthrone, or isoviolanthrone-series pigment, or a mixture thereof.

More specifically, examples of the organic pigment include perylene-compound pigments, such as C.I. Pigment Red 190 (C.I. No. 71140), C.I. Pigment Red 224 (C.I. No. 71127), C.I. Pigment Violet 29 (C.I. No. 71129), or the like; perynone-compound pigments, such as C.I. Pigment Orange 43 (C.I. No. 71105), C.I. Pigment Red 194 (C.I. No. 71100) or the like; quinacridone-compound pigments, such as C.I. Pigment Violet 19 (C.I. No. 73900), C.I. Pigment Violet 42, C.I. Pigment Red 122 (C.I. No. 73915), C.I. Pigment Red 192, C.I. Pigment Red 202 (C.I. No. 73907), C.I. Pigment Red 207 (C.I. Nos. 73900, 73906), or C.I. Pigment Red 209 (C.I. No. 73905); quinacridonequinone-compound pigments, such as C.I. Pigment Red 206 (C.I. No. 73900/73920), C.I. Pigment Orange 48 (C.I. No. 73900/73920), C.I. Pigment Orange 49 (C.I. No. 73900/73920), or the like; anthraquinone-compound pigments, such as C.I. Pigment Yellow 147 (C.I. No. 60645) or the like; anthanthrone-compound pigments, such as C.I. Pigment Red 168 (C.I. No. 59300) or the like; benzimidazolone-compound pigments, such as C.I. Pigment Brown 25 (C.I. No. 12510), C.I. Pigment Violet 32 (C.I. No. 12517), C.I. Pigment Yellow 180 (C.I. No. 21290), C.I. Pigment Yellow 181 (C.I. No. 11777), C.I. Pigment Orange 62 (C.I. No. 11775), C.I. Pigment Red 185 (C.I. No. 12516), or the like; condensed disazo-compound pigments, such as C.I. Pigment Yellow 93 (C.I. No. 20710), C.I. Pigment Yellow 94 (C.I. No. 20038), C.I. Pigment Yellow 95 (C.I. No. 20034), C.I. Pigment Yellow 128 (C.I. No. 20037), C.I. Pigment Yellow 166 (C.I. No. 20035), C.I. Pigment Orange 34 (C.I. No. 21115), C.I. Pigment Orange 13 (C.I. No. 21110), C.I. Pigment Orange 31 (CI. No. 20050), C.I. Pigment Red 144 (C.I. No. 20735), C.I. Pigment Red 166 (C.I. No. 20730), C.I. Pigment Red 220 (C.I. No. 20055), C.I. Pigment Red 221 (C.I. No. 20065), C.I. Pigment Red 242 (C.I. No. 20067), C.I. Pigment Red 248, C.I. Pigment Red 262, C.I. Pigment Brown 23 (C.I. No. 20060), or the like; disazo-compound pigments, such as C.I. Pigment Yellow 13 (C.I. No. 21100), C.I. Pigment Yellow 83 (C.I. No. 21108), C.I. Pigment Yellow 188 (C.I. No. 21094), or the like; azo-compound pigments, such as C.I. Pigment Red 187 (C.I. No. 12486), C.I. Pigment Red 170 (C.I. No. 12475), C.I. Pigment Yellow 74 (C.I. No. 11714), C.I. Pigment Red 48 (C.I. No. 15865), C.I. Pigment Red 53 (C.I. No. 15585), C.I. Pigment Orange 64 (C.I. No. 12760), C.I. Pigment Red 247 (C.I. No. 15915), or the like; indanthrone-compound pigments, such as C.I. Pigment Blue 60 (C.I. No. 69800), or the like; phthalocyanine-compound pigments, such as C.I. Pigment Green 7 (C.I. No. 74260), C.I. Pigment Green 36 (C.I. No. 74265), Pigment Green 37 (C.I. No. 74255), Pigment Blue 16 (C.I. No. 74100), C.I. Pigment Blue 75 (C.I. No. 74160:2), 15 (C.I. No. 74160), or the like; triaryl carbonium-compound pigments, such as C.I. Pigment Blue 56 (C.I. No. 42800), C.I. Pigment Blue 61 (C.I. No. 42765:1), or the like; dioxazine-compound pigments, such as C.I. Pigment Violet 23 (C.I. No. 51319), C.I. Pigment Violet 37 (C.I. No. 51345), or the like; aminoanthraquinone-compound pigments, such as C.I. Pigment Red 177 (C.I. No. 65300), or the like; diketopyrrolopyrrole-compound pigments, such as C.I. Pigment Red 254 (C.I. No. 56110), C.I. Pigment Red 255 (C.I. No. 561050), C.I. Pigment Red 264, C.I. Pigment Red 272 (C.I. No. 561150), C.I. Pigment Orange 71, C.I. Pigment Orange 73, or the like; thioindigo-compound pigments, such as C.I. Pigment Red 88 (C.I. No. 73312), or the like; isoindoline-compound pigments, such as C.I. Pigment Yellow 139 (C.I. No. 56298), C.I. Pigment Orange 66 (C.I. No. 48210), or the like; isoindolinone-compound pigments, such as C.I. Pigment Yellow 109 (C.I. No. 56284), C.I. Pigment Orange 61 (C.I. No. 11295), or the like; pyranthrone-compound pigments, such as C.I. Pigment Orange 40 (C.I. No. 59700), C.I. Pigment Red 216 (C.I. No. 59710), or the like; or isoviolanthrone-compound pigments, such as C.I. Pigment Violet 31 (C.I. No. 60010), or the like.

Preferred pigments are quinacridone-compound pigments, diketopyrrolopyrrole-compound pigments, phthalocyanine-compound pigments, or azo-compound pigments.

In a method of concentrating nanoparticles according to the present invention, a mixture of two or more organic pigments, a solid solution of organic pigments, or a combination of organic and inorganic pigments may also be used.

Examples of the organic colorants include azo-compound colorants, cyanine-compound colorants, merocyanine-compound colorants, coumarin-compound colorants, and the like. Examples of the polymeric compounds include polydiacetylene, polyimide, and the like.

The nanoparticles for use in a method of concentrating nanoparticles according to the present invention are not particularly limited in their particle diameter, particle shape, and particle uniformity (i.e., not varying in particle size) in a dispersion liquid, as long as the particles are dispersible favorably in the solvent.

As to the average diameter of particles, an average scale of a group can be digitalized by several measurement methods. There are frequently-used parameters such as mode diameter indicating the maximum value of distribution, median diameter corresponding to the median value in the integral frequency distribution curve, and various average diameters (number-averaged, length-averaged, area-averaged, weight-averaged diameters, or the like), or the like. In the present invention, the particle diameter means a number-averaged diameter, unless otherwise particularly specified. The particle diameter of the nanoparticles (primary particles) contained in the nanoparticles-dispersion liquid for use in a method of concentrating nanoparticles according to the present invention is preferably 1 to 200 nm, more preferably 2 to 100 nm, and particularly preferably 5 to 80 nm.

Further, in the present invention, a ratio (Mv/Mn) of volume-averaged diameter (Mv) to number-averaged diameter (Mn) is used as the indicator of the degree of the uniformity in particle size (degree of monodispersion of particles uniform in size), unless otherwise particularly specified. The ratio Mv/Mn of the particles (primary particles) contained in the nanoparticles-dispersion liquid for use in a method of concentrating nanoparticles according to the present invention is preferably 1.0 to 2.0, more preferably 1.0 to 1.8, and particularly preferably 1.0 to 1.5.

The dispersion solvent favorably used in a method of concentrating nanoparticles according to the invention will be described below. The dispersion solvent is not particularly limited as long as it can disperse nanoparticles and it is suitable for dispersing the aggregated nanoparticles, and it is preferably a poor solvent for the nanoparticles. Examples of the dispersion solvents include aqueous solvents (e.g., water, or solution which mainly includes water, such as aqueous hydrochloric acid solution, aqueous sodium hydroxide solution, and aqueous solutions containing a surfactant), alcohol compound solvents, ketone compound solvents, ether compound solvents, aromatic compound solvents, carbon compound disulfide solvents, aliphatic compound solvents, nitrile compound solvents, sulfoxide compound solvents, halogenated compound solvents, ester compound solvents, ionic solvents, the mixed solvents thereof, and the like.

Examples of the alcohol compound solvents include methanol, ethanol, isopropyl alcohol, n-propyl alcohol, 1-methoxy-2-propyl alcohol, and the like. Examples of the ketone compound solvents include methylethylketone, methylisobutylketone, cyclohexanone, and the like. Examples of ether compound solvents include dimethylether, diethylether, tetrahydrofuran and the like. Examples of the aromatic compound solvents include benzene, toluene, xylene, and the like. Examples of the aliphatic compound solvents include hexane, and the like. Examples of the nitrile compound solvents include acetonitrile, and the like. Examples of the sulfoxide compound solvents include dimethylsulfoxide, and the like. Examples of the halogenated compound solvents include dichloromethane, trichloroethylene, and the like. Examples of the ester compound solvents include ethyl acetate, ethyl lactate, 2-(1-methoxy) propyl acetate, and the like. Examples of the ionic solvents include a salt of 1-butyl-3-methylimidazolium and $PF_6^-$, and the like.

Favorable dispersion solvents include aqueous solvents, ketone compound solvents, alcohol compound solvents, and ester compound solvents; aqueous solvents and alcohol compound solvents are more preferable. The dispersion solvent may be a pure solvent of one of the above-described favorable solvents, or a mixture of multiple solvents.

The amount of the dispersion solvent used is not particularly limited, as long as it can disperse nanoparticles, and a range of 1,000 ml of the dispersion solvent is preferably for 10 to 10,000 mg of nanoparticles, more preferably in a range of 1,000 ml of the dispersion solvent for 20 to 7,000 mg of nanoparticles, and particularly preferably in a range of 1,000 ml of the dispersion solvent for 50 to 5,000 mg of nanoparticles. Too much dispersion solvent leads to problems of taking too much time for concentration, while too little dispersion solvent to problems of making a particle diameter too large and the like.

The dispersant for use in a method of concentrating nanoparticles according to the present invention is not particularly limited, as long as it can give a favorable dispersion state.

Any one of common methods may be used for preparing a nanoparticles-dispersion liquid for example, by preparing a solution of an organic pigment dissolved in a dispersant and a poor solvent such as an aqueous solvent, and adding the pigment solution gradually into the poor solvent while the poor solvent is stirred with a stirrer and the like.

On the other hand, a nanoparticles-dispersion liquid prepared by a liquid-phase or laser-ablation method may be used. This means that a method of producing a dispersion liquid of particle size-controlled nanoparticles and a method of concentrating nanoparticles according to the present invention can be combined. That is, a series of production process can be realized by producing desirable nanoparticles in a dispersion liquid, concentrating and extracting the nanoparticles, and further, isolating and collecting the nanoparticles. Furthermore, a method of deaggregating aggregated nanoparticles, described in the following paragraphs, can be preferably combined after a method of concentrating nanoparticles of the present invention. Thus, formation of nanoparticles, concentration, extraction, and redispersion can be conducted in one batch, and thereby production efficiency and quality can be improved. The methods described, for example, in JP-A-H06-79168 and JP-A-2004-91560 and others may be used as a method of preparing a nanoparticles-dispersion liquid. At the time, the nanoparticles-dispersion liquid may contain additives added in the production processes unless they interfer extraction and concentration operations of the present invention.

The extraction solvent for use in a method of concentrating nanoparticles according to the present invention is not particularly limited, as long as a solvent can extract the nanoparticles, but it is preferably a solvent that is substantially incompatible with the dispersion solvent (In the present invention, the term of substantially incompatible means that the compatibility is low, and the solvent is soluble preferably in an amount of 50 wt % or less, and more preferably 30 wt % or less. A lower limit of a soluble amount is not particularly limited, but the solvent is practically soluble in an amount of 1 wt % or more.), and that forms an interface after the extraction solvent is mixed with the dispersion solvent and left still.

In addition, the extraction solvent for use in a method of concentrating nanoparticles according to the present invention is preferably a solvent that causes weak aggregation to such a degree that the nanoparticles can be redispersed in the extraction solvent. In the present invention, weak, redispersible aggregation means that aggregates can be redispersed by agitation, and preferably that aggregates can be redispersed even without high shearing force such as by milling or high-speed agitation. Such a state is preferable, because it is possible to prevent strong aggregation that may change the particle size, and to swell the desirable nanoparticles with the extraction solvent, besides the dispersion solvent such as water can be easily and rapidly removed by filter-filtration. The size of the aggregated particles is not particularly limited as long as filtration is possible, but a lower limit of a number-averaged particle diameter is, for example, preferably 5 nm, more preferably 10 nm, and particularly preferably 20 nm; an upper limit of a number-averaged particle diameter is, for example, preferably 5000 nm, more preferably 2000 nm, further more preferably 1000 nm, and particularly preferably 200 nm.

Any conventional method may be used to disperse the aggregated particles, and for example, ultrasonic irradiation may be performed.

Thus, the extraction solvent for use in a method of concentrating nanoparticles according to the present invention is preferably decided, taking into consideration the relationships with the dispersion solvent as well as with the nanoparticles. For example, when the nanoparticles are particles made of an organic pigment and the dispersion solvent is an aqueous solvent, the extraction solvent is a solvent that is substantially incompatible with the aqueous solvent, that forms an interface when mixed and left still, and that preferably causes weak aggregation of the nanoparticles.

Examples of the extraction solvents include ester compound solvents (ethyl acetate, ethyl lactate, butyl acetate, etc.), n-butanol, isobutanol, n-hexane, cyclohexane, benzene, toluene, xylene, and the like; ester compound solvents (ethyl acetate, ethyl lactate, butyl acetate, etc.) are preferable; ethyl lactate or 2-(1-methoxy) propyl acetate is more preferable; and 2-(1-methoxy) propyl acetate is particularly preferable. The extraction solvent may be a pure solvent of one of the preferable solvents above, while it may be a mixed solvent of multiple solvents.

An amount of the extraction solvent is not particularly limited, as long as the solvent can extract the nanoparticles, but an amount of the extraction solvent is preferably smaller than an amount of the nanoparticle dispersion liquid, considering extraction for concentration. When expressed by volume ratio, an amount of the added extraction solvent is preferably in the range of 1 to 50, more preferably in the range of 2 to 33, and particularly preferably in the range of 10 to 25, with respect to 100 of the nanoparticles-dispersion liquid. Too great an amount may results in elongation of the period for concentration, while too small an amount may cause to insufficient extraction.

After addition of the extraction solvent, it is preferably agitated well with the dispersion liquid for sufficient mutual contact (for example, at 10 to 2,000 rpm). Any conventional method may be used for agitation and mixing. A temperature during addition and mixing of the extraction solvent is not particularly limited, but preferably 5 to 60° C. and more preferably 10 to 50° C. Any apparatus may be used for addition and mixing of the extraction solvent as long as it is suitable for each step, but a separatory funnel-like apparatus or the like may be used.

A filtration method for use in a method of concentrating nanoparticles according to the present invention is not particularly limited, as long as it can separate a liquid of concentrated extract (In the present invention, the term of a liquid of concentrated extract means a liquid obtained by concentrating and extracting a nanoparticles-dispersion liquid.) from the residual dispersion solvent, and filtration by using a filter is preferable. The apparatus for filter-filtration is, for example, a high-pressure filtration apparatus. Preferable filters include nanofilter, ultrafilter and the like. It is preferable to remove a residual dispersion solvent, and further preferable to concentrate nanoparticles in a liquid of concentrated extract for preparing a nanoparticles-concentrated liquid by filter filtration. The density of the nanoparticles-concentrated liquid obtained by a production method according to the present invention is preferably 0.1 to 50 wt %, more preferably 1 to 40 wt %, and particularly preferably 5 to 30 wt %. The nanoparticles-concentrated liquid may be in a condition of a high-density paste.

According to a method of concentrating nanoparticles of the present invention, it is possible to concentrate nanoparticles from a nanoparticle dispersion liquid efficiently. As for the concentration ratio, it is possible, for example, to raise the density of nanoparticles preferably 100 to 1,000 times, more preferably 500 to 1,000 times, from the density of a raw liquid, i.e. a nanoparticles-dispersion liquid.

In addition, according to a method of concentrating nanoparticles of the present invention, it is possible to realize a high extraction rate by almost eliminating residual nanoparticles in the residual dispersion solvent after extraction of the nanoparticles, and for example the amount of the residual nanoparticle in the dispersion solvent can be reduced approximately to 0.1 to 1 wt %.

Hereinafter, a method of deaggregating aggregated nanoparticles of the present invention will be described.

According to a method of deaggregating aggregated nanoparticles of the present invention, it is possible to fine and disperse the nanoparticles that are in an aggregation state (In the present invention, fining and dispersing means breaking aggregation of the particles in a dispersion liquid and increasing a degree of dispersion).

The nanoparticles are normally aggregated by concentration, especially when the above-described nanoparticles-concentrated liquid is made in a state allowing rapid filter filtration. Thus, redispersion by common deaggregating methods is insufficient for conversion into nanoparticles, and a method having higher efficiency for fining and dispersing is required. Even with such aggregated nanoparticles (In the present invention, the term of aggregated nanoparticles means flocks of nanoparticles combined by secondary force, such as aggregates), it is possible to fine and redisperse the nanoparticles by applying ultrasonic waves different in frequency sequentially according to a method of deaggregating aggregated nanoparticles of the present invention. Frequencies of the ultrasonic waves applied sequentially are preferably increased from low frequency to high frequency.

The frequency is preferably varied to higher frequency, i.e. the frequency is preferably raised, in the range of 2 to 200 kHz. More preferably, an ultrasonic wave at 2 kHz or more, less than 30 kHz is applied; then that of 30 kHz or more, less than 100 kHz is applied; and then that of 100 kHz to 200 kHz is applied. Particularly preferably, an ultrasonic wave at 10 kHz or more, less than 30 kHz is applied; and then that of 30 to 60 kHz is applied. In addition, a series of irradiations of different ultrasonic waves at different frequencies may be applied repeatedly multiple times. The frequency may be switched continuously or discontinuously.

The ultrasonic irradiation may be performed multiple times unlimitedly until dispersion can be completed, but the number of cycles is preferably 2 to 100 times and more preferably 2 to 10 times. The period of ultrasonic wave irradiation at each of frequencies is not limited, but preferably 10 to 1,000 minutes and more preferably 10 to 600 minutes. Apparatus of ultrasonic wave irradiation for use in a method of deaggregating aggregated nanoparticles according to the present invention is preferably an apparatus that is capable of applying an ultrasonic wave at 10 kHz or more, and examples thereof include an ultrasonic wave homogenizer, an ultrasonic wave cleaning machine, and the like. A liquid temperature during ultrasonic wave irradiation is preferably kept at 1 to 100° C., more preferably 5 to 60° C., because increase in the liquid temperature leads to thermal aggregation of nanoparticles ("Current Pigment Dispersion Technology" Technical Information Institute Co., Ltd., 1995, p. 166). The temperature can be controlled, for example, by adjusting the temperature of dispersion liquid indirectly by adjusting the temperature of the temperature-control layer for control of dispersion liquid temperature, or the like.

A method of deaggregating aggregated nanoparticles of the present invention, in different from a method of irradiating an ultrasonic wave at a fixed frequency, enables to fine and disperse aggregated nanoparticles by virtue of sufficient affinity of nanoparticles and a solvent. The nanoparticles obtained by a method of deaggregating aggregated nanoparticles of the present invention is preferably dispersed into primary particles; a particle diameter thereof is preferably 1 to 200 nm, more preferably 2 to 100 nm, particularly preferably 5 to 80 nm.

In comparison to a dispersion state obtained by irradiation of a fixed frequency, a method of deaggregating aggregated nanoparticles of the present invention can decreases an average particle diameter preferably by 10 to 90%, more preferably by 20 to 90%, more preferably by 20 to 90%. Further, as to particle diameter distribution, a method of deaggregating aggregated nanoparticles can decrease Mv/Mn preferably by 10 to 90%, more preferably 20 to 90%.

According to a method of concentrating nanoparticles of the present invention, it is possible to concentrate nanoparticles efficiently (for example, approximately 500 to 1,000 times), by removing a dispersion solvent from a nanoparticles-dispersion liquid (for example, an dispersion liquid containing organic pigment nanoparticles prepared by a liquid-phase method). It is also possible to use a method practically at a commercial production scale without unneeded energy or excessive facilities. Further, the method enables to concentrate nanoparticles rapidly by using a extract solvent which causes weak aggregation to the degree that the aggregates are redispersible, and there by nanoparticles (primary particles) having a fine particle diameter can be obtained in a monodispersion state. The nanoparticles-concentrated liquid prepared by a concentration method according to the present invention, and the nanoparticles obtained therefrom can be used favorably in inkjet ink or as the raw fine particles therein, and in a color filter coating solution or as the raw fine particles therein.

Further, according to a method of deaggregating aggregated nanoparticles of the present invention, it is possible to efficiently redisperse aggregated nanoparticles such as particles residing in a slurry state. It is also possible to disperse aggregated nanoparticles in a concentration liquid obtained from a dispersion liquid prepared by a liquid-phase or laser-ablation method, efficiently in a short period of time at low energy consumption. According to the method of deaggregating aggregated nanoparticles of the present invention, it is also possible to disperse particles finely to the degree that was impossible hitherto, by irradiating with ultrasonic waves different in frequency. It is also possible to produce nanoparticles and the dispersion thereof suitable for use in color filter coating solutions and inkjet inks at a commercial scale.

The present invention will be described in more detail based on the following examples, but the present invention is not limited thereto.

EXAMPLES

In the following examples, the dispersion/aggregation states of particles are determined by using a scanning electron microscope and Nanotrack UPA-EX150 manufactured by Nikkiso Co., Ltd.

Example 1

410 mg of a pigment (Pigment Red 122) was dissolved in 120 ml of 1-methyl-2-pyrrolidone, to give a pigment solution. Separately, 1,000 ml of water was made available as a poor solvent.

The pigment solution was injected into the poor solvent kept at a temperature of 1° C. as it is agitated by a Ramond stirrer GK-0222-10 manufactured by Fujisawa Pharmaceutical Co., Ltd. at a frequency of 500 rpm, by using a large-volume non-pulsating pump NP-KX-500 manufactured by Nihon Seimitsu Kagaku company at a flow rate of 50 ml/min, to give a nanopigment-dispersion liquid (particle diameter: 20 nm, and Mv/Mn: 1.41).

200 ml of 2-(1-methoxy) propyl acetate was added to the nanopigment dispersion liquid thus prepared (nanopigment density: approximately 0.04 wt %), and the mixture was agitated at 100 rpm at 20° C. for 10 minutes to make the nanopigment extracted in the 2-(1-methoxy) propyl acetate phase, giving a liquid of concentrated extract. After extraction, the amount of the nanopigment contained in the residual dispersion solvent decreased to approximately 5 wt % or less.

The liquid of concentrated extract containing the extracted nanopigment was filtered by using FP-100 filter manufactured by Sumitomo Electric Fine Polymer Inc., to give a paste-like-concentrated liquid containing the pigment (nanopigment density: approximately 30 wt %). By the result, it is understood that the nanopigment was easily concentrated in approximately 750 times from the raw dispersion liquid, according to a method of concentrating nanoparticles of the present invention.

Example 2

610 mg of a pigment (Pigment Red 122) and 10 ml of aqueous 1 mol/l sodium hydroxide solution were dissolved in 120 ml of 1-methyl-2-pyrrolidone, to give a pigment solution. Separately, 1,000 ml of ultrapure water containing 8 ml of aqueous 1 mol/l hydrogen chloride solution was made available as a poor solvent.

The pigment solution was injected into the poor solvent kept at a temperature of 1° C. as it is agitated by a Ramond stirrer GK-0222-10 manufactured by Fujisawa Pharmaceutical Co., Ltd. at a frequency of 500 rpm, by using a large-volume non-pulsating pump NP-KX-500 manufactured by Nihon Seimitsu Kagaku Co., Ltd. at a flow rate of 50 m/min, to give a nanopigment-dispersion liquid (particle diameter: 21 nm, and Mv/Mn: 1.35).

200 ml of 2-(1-methoxy) propyl acetate was added to the nanopigment dispersion liquid thus prepared (nanopigment density: approximately 0.06 wt %), and the mixture was agitated at 100 rpm at 20° C. for 10 minutes, to make the nanopigment extracted in the 2-(1-methoxy) propyl acetate phase, to give a liquid of concentrated extract. After extraction, the amount of the nanopigment contained in the residual dispersion solvent decreased to approximately 5 wt % or less.

The liquid of concentrated extract of the extracted nanopigment was filtered by using FP-100 filter manufactured by Sumitomo Electric Fine Polymer Inc., to give a paste-like-concentrated liquid containing the pigment (nanopigment density: approximately 30 wt %). By the result, it is understood that the nanopigment was concentrated in approximately 500 times from the raw dispersion liquid, according to a method of concentrating nanoparticles of the present invention.

Test Example

A nanopigment was concentrated in a similar manner to Example 2, except that 2-(1-methoxy) propyl acetate was replaced with ethyl acetate, toluene, n-hexane, or cyclohexane in other examples, and with chloroform in a comparative example. The results are summarized, together with the results in example 2, in Table 1.

TABLE 1

| | 2-(1-Methoxy) propyl acetate | Ethyl acetate | Toluene | n-Hexane | Cyclohexane | Chloroform |
|---|---|---|---|---|---|---|
| Extraction efficiency | Favorable | Favorable | Favorable | Fair | Fair | Unfavorable |
| Filtration efficiency | Favorable | Favorable | Favorable | Fair | Fair | Impossible |
| Dispersion efficiency | Favorable | Fair | Fair | Fair | Fair | Impossible |

The extraction efficiency was evaluated by the amount of the pigment remaining in the residual dispersion solvent, and a residual amount of less than 10 wt % is expressed "favorable"; that of 10 wt % or more and less than 20 wt %, "fair"; and that of 20 wt % or more, "unfavorable".

The filtration efficiency was evaluated by the concentration rate, and a concentration rate of 200 times or more is expressed "favorable", and that of 100 times or more and less than 200 times "fair".

The dispersion efficiency was evaluated by the ratio of particle diameter after redispersion/particle diameter during dispersion, and a ratio of 1 or more and less than 2 was expressed "favorable", and that of 2 or more and less than 5, "fair".

Since the extraction test was difficult "unfavorable" in chloroform, it was not possible to perform other test items (filtration and dispersion efficiencies). Thus, they are expressed "impossible" in the Table.

Example 3

410 mg of a pigment (Pigment Red 122) was dissolved in 120 ml of 1-methyl-2-pyrrolidone, to give a pigment solution. Separately, 1,000 ml of water was made available as a poor solvent.

The pigment solution was injected into the poor solvent kept at a temperature of 1° C. as it is agitated by a Ramond stirrer GK-0222-10 manufactured by Fujisawa Pharmaceutical Co., Ltd. at a frequency of 500 rpm, by using a large-volume non-pulsating pump NP-KX-500 manufactured by Nihon Seimitsu Kagaku company at a flow rate of 50 ml/min, to give a nanopigment-dispersion liquid.

200 ml of 2-(1-methoxy) propyl acetate was added to the nanopigment dispersion liquid thus prepared (nanopigment density: approximately 0.04 wt %), and the mixture was agitated at 500 rpm at 25° C. for 10 minutes and left still for 180 minutes to make the nanopigment extracted in the 2-(1-methoxy) propyl acetate phase, giving a liquid of concentrated extract.

The liquid of concentrated extract containing the extracted nanopigment was filtered by using FP-100 filter manufactured by Sumitomo Electric Fine Polymer Inc., to give a paste-like-concentrated liquid containing the pigment (nanopigment density: approximately 30 wt %). In this state, the pigment was in a aggregated state, and the particle diameter was 103 nm.

5 ml of cyclohexanone was added to 1.0 g of the paste-like-concentrated liquid containing the pigment, to give a sample pigment liquid (I) for ultrasonic irradiation. The sample pigment liquid (I) was ultrasonicated in an ultrasonic homogenizer Sonifier II manufactured by Branson at a frequency 20 kHz for 5 minutes (ultrasonic wave irradiation i). The liquid was ultrasonicated additionally in an ultrasonic homogenizer Model 200bdc-h 40:0.8 manufactured by Branson at a frequency of 40 kHz for 10 minutes (ultrasonic wave irradiation ii).

The ultrasonic wave irradiations i and ii were repeated five times, until complete dispersion of the pigment particles was confirmed by visual observation. During ultrasonic irradiation the sample pigment liquid was kept at 25° C., as it is cooled in Coolnics CTW400 manufactured by Yamato Scientific Co., Ltd. The pigment fine particles in the sample liquid obtained had a particle diameter of 22 nm and a ratio Mv/Mn of 1.39.

Example 4

610 mg of a pigment (Pigment Red 122) and 10 ml of aqueous 1 mol/l sodium hydroxide solution were dissolved in 120 ml of 1-methyl-2-pyrrolidone, to give a pigment solution. Separately, 1,000 ml of ultrapure water containing 8 ml of aqueous 1 mol/l hydrogen chloride solution was made available as a poor solvent.

The pigment solution was injected into the poor solvent kept at a temperature of 1° C. as it is agitated by a Ramond stirrer GK-0222-10 manufactured by Fujisawa Pharmaceutical Co., Ltd. at a frequency of 500 rpm, by using a large-volume non-pulsating pump NP-KX-500 manufactured by Nihon Seimitsu Kagaku Co., Ltd. at a flow rate of 50 ml/min, to give a nanopigment-dispersion liquid.

200 ml of 2-(1-methoxy) propyl acetate was added to the nanopigment dispersion liquid thus prepared (nanopigment density: approximately 0.06 wt %), and the mixture was agitated at 500 rpm at 25° C. for 10 minutes and left still for 180 minutes, to make the nanopigment extracted in the 2-(1-methoxy) propyl acetate phase, to give a liquid of concentrated extract.

The liquid of concentrated extract of the extracted nanopigment was filtered by using FP-100 filter manufactured by Sumitomo Electric Fine Polymer Inc., to give a paste-like-concentrated liquid containing the pigment (nanopigment density: approximately 30 wt %). In this state, the pigment was in a aggregated state, and the particle diameter was 120 nm.

5 ml of cyclohexanone was added to 1.0 g of the paste-like-concentrated liquid containing the pigment, to give a sample pigment liquid (II) for ultrasonic irradiation. The sample pigment liquid (II) was ultrasonicated in an ultrasonic homogenizer Sonifier II manufactured by Branson company at a frequency 20 kHz for 5 minutes (ultrasonic wave irradiation iii). The liquid was ultrasonicated additionally in an ultrasonic homogenizer Model 200bdc-h 40:0.8 manufactured by Branson company at a frequency of 40 kHz for 10 minutes (ultrasonic wave irradiation iv).

The ultrasonic wave irradiations iii and iv were repeated five times, until complete dispersion of the pigment particles was confirmed by visual observation. During ultrasonic irradiation the sample pigment liquid was kept at 25° C., as it is cooled in Coolnics CTW400 manufactured by Yamato Scientific Co., Ltd. The pigment fine particles in the sample liquid obtained had a particle diameter of 25 nm and a ratio Mv/Mn of 1.40.

Example 5

A sample pigment liquid (II) prepared by the method described in Example 4 was ultrasonicated at 20 kHz for 10 minutes and additionally at 40 kHz for 10 minutes. An ultrasonic homogenizer model 450 manufactured by Branson company was used for ultrasonic irradiation at 20 kHz, while an ultrasonic wave cleaning machine W-121 manufactured by Honda company was used for ultrasonic irradiation at 40 kHz. The sample pigment liquid was then kept at 25° C., as it is cooled in Coolnics CTW400 manufactured by Yamato Scientific Co., Ltd. The change in light-scattering intensity of the pigment liquid was plotted against the amount of ultrasonic irradiation in FIG. 1. The light-scattering intensity was determined by using a spectrophotometer model 8453 manufactured by Agilent company.

As apparent from the results shown in FIG. 1, the light-scattering intensity ceased to decrease by ultrasonic irradiation at 20 kHz, but decreased further by additional ultrasonic irradiation at 40 kHz. The result indicates that it was possible to fine and disperse pigment particles more finely by applying ultrasonic waves different in frequency.

The reagents used are specifically the followings:

| Reagent | Manufacturer |
| --- | --- |
| Pigment Red 122 (Lionogen Magenta R) | Toyo Ink Mfg Co., Ltd. |
| Methanol | Wako Pure Chemical Industries, Ltd. |
| Cyclohexanone | Wako Pure Chemical Industries, Ltd. |
| 1-Methyl-2-pyrrolidone (dehydrated) | Wako Pure Chemical Industries, Ltd. |
| 2-(1-Methoxy) propyl acetate | Wako Pure Chemical Industries, Ltd. |
| Aqueous 1 mol/L sodium hydroxide solution | Wako Pure Chemical Industries, Ltd. |
| Aqueous 1 mol/L hydrochloride solution | Wako Pure Chemical Industries, Ltd. |

INDUSTRIAL APPLICABILITY

According to the method of concentrating nanoparticles of the present invention, it is possible to extract and concentrate nanoparticles having a minute particle diameter at the nanometer size (for example, 10 to 100 nm). Further, according to the method of deaggregating aggregated nanoparticles of the present invention, it is possible to obtain fined and dispersed nanoparticles into primary particles, by fining and dispersing them efficiently, even when nanoparticles are aggregated in a concentrated liquid.

For these reasons, it is possible to use obtained nanoparticles or a mixed liquid containing them for preparing an inkjet ink high in optical density, in chroma, and in vivid, further superior in uniformity of its image surface. It is also possible to use them for preparing color filters high in optical density, superior in uniformity of the filter surface, high in contrast, and less in noises of images.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2005-135205 filed in Japan on May 6, 2005, and Patent Application No. 2005-135206 filed in Japan on May 6, 2005, each of which is entirely herein incorporated by reference.

The invention claimed is:

1. A method of concentrating nanoparticles, comprising the steps of:

preparing a nanoparticle-dispersion liquid comprising pigment nanoparticles having an average diameter of 5 nm to 200 nm dispersed in an aqueous solvent, the organic pigment nanoparticles being made of quinacridone-compound pigment an azo-series pigment, a diketopyrrolopyrrole-series pigment, and mixtures thereof;

adding and mixing an ester compound solvent with the nanoparticle-dispersion liquid so as to form a liquid of concentrated extract by concentrating and drawing the organic pigment nanoparticles from a phase of the aqueous solvent into a phase of the ester compound solvent, and removing the ester compound solvent by filter-filtrating the liquid of concentrated extract;

wherein the ester compound solvent is substantially incompatible with the aqueous solvent, and wherein the ester compound solvent can form an interface after the ester compound solvent is mixed with the aqueous solvent and the mixture is left still.

2. The method of concentrating nanoparticles according to claim 1, wherein concentration and drawing of the nanoparticles into a phase of the ester compound solvent provides aggregation of the nanoparticles to the degree that the nanoparticles are redispersible.

3. The method of concentrating nanoparticles according to claim 1, wherein the ester compound solvent is ethyl acetate, ethyl lactate, or butyl acetate.

4. The method of concentrating nanoparticles according to claim 1, wherein a density of nanoparticles in the concentrated extract is 100 to 1,000 times a density of the nanoparticles-dispersion liquid.

* * * * *